(12) United States Patent
Kehrmann

(10) Patent No.: US 7,097,816 B2
(45) Date of Patent: Aug. 29, 2006

(54) METHOD OF PRODUCING FERROUS SULFATE HEPTAHYDRATE

(75) Inventor: Alexander Kehrmann, Marie-Curie-Strasse 17, Xanten (DE) 46509

(73) Assignee: Alexander Kehrmann, Xanten (DE)

( * ) Notice: Subject to any disclaimer, the term of this patent is extended or adjusted under 35 U.S.C. 154(b) by 0 days.

(21) Appl. No.: 10/897,602

(22) Filed: Jul. 23, 2004

(65) Prior Publication Data

US 2005/0281732 A1    Dec. 22, 2005

(30) Foreign Application Priority Data

Jun. 22, 2004    (EP) .................... 04014637

(51) Int. Cl.
*C01G 49/14*    (2006.01)

(52) U.S. Cl. ............... 423/146; 423/150.3; 423/558; 423/DIG. 2

(58) Field of Classification Search ........... 423/558, 423/150.3, 146, 488, DIG. 2
See application file for complete search history.

(56) References Cited

U.S. PATENT DOCUMENTS

| | | | | |
|---|---|---|---|---|
| 3,100,727 A | * | 8/1963 | Labergere | 134/13 |
| 3,340,015 A | * | 9/1967 | Karsay | 23/293 R |
| 3,635,664 A | * | 1/1972 | Morimoto | 423/146 |
| 4,222,997 A | * | 9/1980 | Beecher | 423/481 |
| 4,382,916 A | * | 5/1983 | Beecher | 423/481 |
| 5,417,955 A | | 5/1995 | Connolly | |
| 2002/0005210 A1 | * | 1/2002 | Olsen et al. | 134/3 |
| 2003/0026746 A1 | * | 2/2003 | Olsen et al. | 422/187 |

FOREIGN PATENT DOCUMENTS

GB    251495    * 5/1926

OTHER PUBLICATIONS

DERWENT Abstract accession No. 1993-019072, for DE 4122920 A1, published Jan. 1993.*
DERWENT Abstract accession No. 1977-88946Y, for JP 52130497, published Nov. 1977.*
EP search report for EP 04 01 4637, dated Nov. 24, 2004.*

* cited by examiner

*Primary Examiner*—Stanley S. Silverman
*Assistant Examiner*—Ardith E. Hertzog
(74) *Attorney, Agent, or Firm*—Henry M. Feiereisen

(57) ABSTRACT

In a method of producing ferrous sulfate heptahydrate, ferrous sulfate monohydrate is converted in a crystallization reactor in the presence of water into ferrous sulfate heptahydrate as crystallized product, and water is subsequently isolated from the ferrous sulfate heptahydrate. Ferrous sulfate monohydrate is obtained from a pickling solution containing ferrous chloride, hydrochloric acid and water and reacted in a precipitating reactor in the presence of excess sulfuric acid to form ferrous sulfate monohydrate and hydrochloric acid. The ferrous sulfate monohydrate is then dehumidified and converted in a crystallization reactor in the presence of excess water into ferrous sulfate heptahydrate.

12 Claims, 1 Drawing Sheet

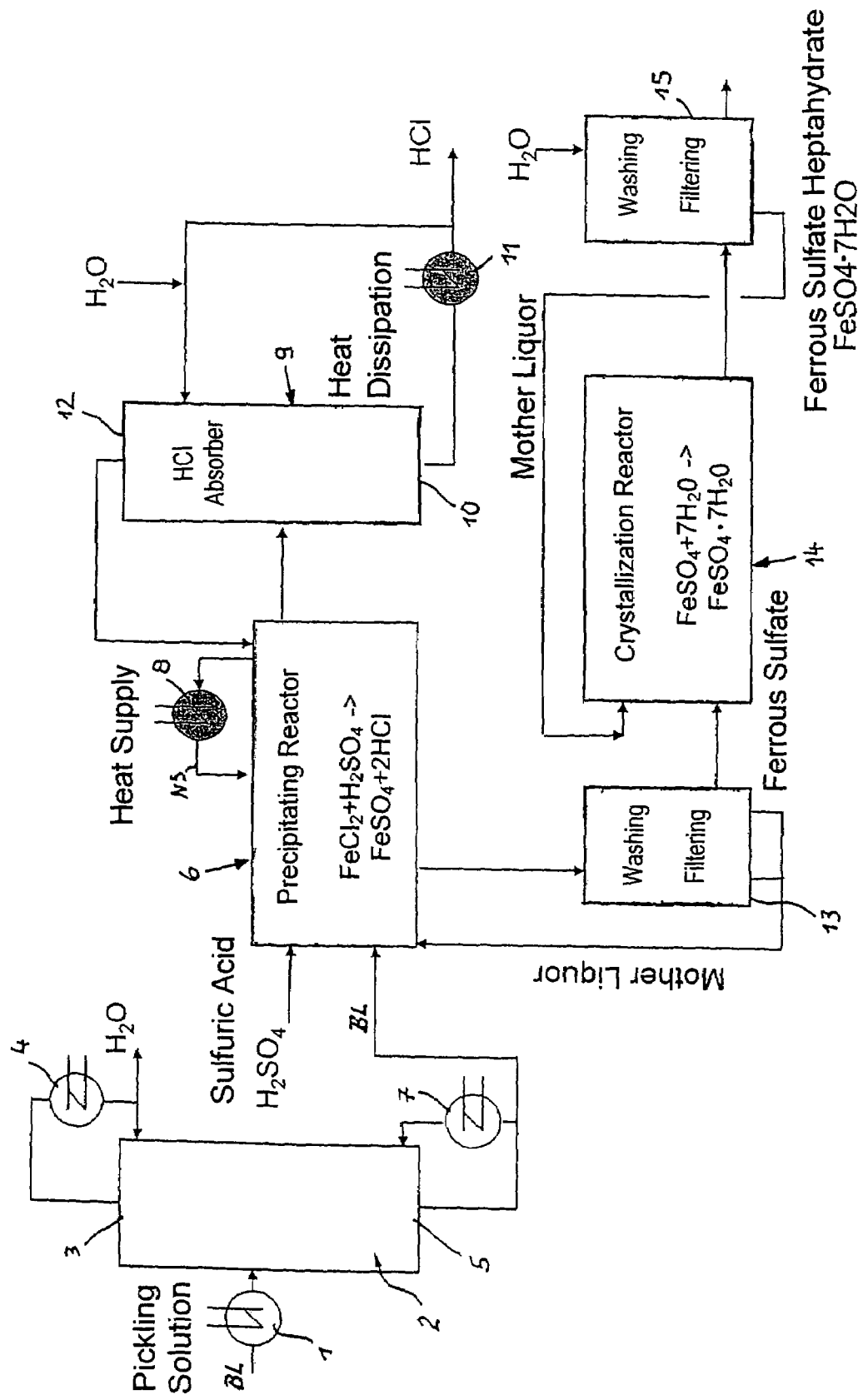

METHOD OF PRODUCING FERROUS SULFATE HEPTAHYDRATE

CROSS-REFERENCES TO RELATED APPLICATIONS

This application claims the priority of European Patent Application, Serial No. 04 014 637.5, filed Jun. 22, 2004, pursuant to 35 U.S.C. 119(a)–(d), the disclosure of which is incorporated herein by reference.

BACKGROUND OF THE INVENTION

The present invention relates to a method of producing ferrous sulfate heptahydrate from ferrous sulfate monohydrate.

Ferrous sulfate heptahydrate is used as chromate reducer for binding harmful chromium compounds in cement or for soil preparation. Further applications of ferrous sulfate heptahydrate include its use as fertilizer, for phosphate precipitation in purification of sewage water, for conditioning of sewage slurry, or as raw material for producing iron oxide pigments.

As metal sheets are pickled in the processing of steel, large quantities of spent pickling solutions (pickling liquor) are produced that pose a hazard to the environment and are difficult to dispose in an economical manner. As a result efforts are under way to treat the pickling liquor for a meaningful recovery and further processing. U.S. Pat. No. 5,417,955, issued May 23, 1995, describes a method and device for treating a pickling liquor to produce hydrochloric acid and ferric sulfate. Ferrous chloride is hereby precipitated in the pickling liquor by mixing with sulfuric acid to produce ferrous sulfate monohydrate in a reactor. Ferrous sulfate monohydrate is subsequently oxidized and converted into ferric sulfate.

It would be desirable and advantageous to provide an improved method of producing ferrous sulfate heptahydrate from ferrous sulfate monohydrate to obviate prior art shortcomings and to allow treatment of in particular spent pickling solution generated by the steel industry.

SUMMARY OF THE INVENTION

According to one aspect of the present invention, a method of producing ferrous sulfate heptahydrate from ferrous sulfate monohydrate includes the steps of converting ferrous sulfate monohydrate in a crystallization reactor in the presence of water into ferrous sulfate heptahydrate as crystallized product, and isolating water from the ferrous sulfate heptahydrate.

The present invention resolves prior art problems by mixing ferrous sulfate monohydrate with excess water in the crystallization reactor in which ferrous sulfate heptahydrate ($FeSO_4 \cdot 7H_{62}O$) is generated after a retention time as a consequence of the water addition. The temperature in the crystallization reactor and the retention time as well as the required water surplus are suited to realize optimal crystallization. The crystallized product produced in this way, i.e. crystalline ferrous sulfate heptahydrate, is then isolated from water.

According to another feature of the present invention, the isolation of the crystallized product from water can be realized in many ways known to the artisan. A currently preferred procedure involves filtering. Another approach involves the use of a centrifuge. The mother liquor that has been filtered out or separated is then returned into the crystallization reactor. Suitably, the crystallized product may be washed, following the separation of water for washing out excess acid fractions.

There are many ways of obtaining ferrous sulfate monohydrate. One example involves the generation of ferrous sulfate monohydrate as filter salt during titanium dioxide production. Currently preferred is however a production of ferrous sulfate monohydrate from a pickling solution generated in the steel industry and containing ferrous chloride ($FeCl_2$), hydrochloric acid (HCl) and water ($H_2O$). Hereby, the pickling solution is treated in a precipitating reactor with sulfuric acid ($H_2SO_4$) with a surplus of sulfuric acid ($H_2SO_4$) to produce ferrous sulfate monohydrate ($FeSO_4$) and hydrochloric acid (HCl). The ratio of pickling solution to sulfuric acid is suitably between 1:3 and 1:5. The pickling solution is intensely subjected to gas and the hot gas phase of inert gas, water and hydrochloric acid is fed to an absorption tower for removal of hydrochloric acid for further processing. Obtained in the reactor is a suspension which contains the ferrous sulfate monohydrate as undissolved component. This suspension is fed to a filter, preferably a band filter. The filtrate is cycled back to the reactor. After dehumidification, the ferrous sulfate monohydrate is fed to the crystallization reactor.

Depending on the acid concentration in the spent pickling solution, the efficiency of the process can be enhanced by increasing the fraction of ferrous chloride in the pickling solution through distillation. In this way, the quality of the obtained salts and the precipitation of ferrous sulfate monohydrate can be improved and controlled. Suitably, the fraction of ferrous chloride ($FeCl_2$) contained in the pickling solution should be greater or equal to 25% by weight.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows is a flow diagram of producing ferrous sulfate heptahydrate by a process in accordance with the present invention.

DETAILED DESCRIPTION OF PREFERRED EMBODIMENTS

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the FIGURE, there is shown a flow diagram of producing ferrous sulfate heptahydrate by a process in accordance with the present invention, using spent pickling solution BL obtained during processing of steel in the steel industry. The process includes four main process steps, namely concentration of pickling solution, precipitation of ferrous sulfate monohydrate, absorption of hydrochloric acid, and crystallization of ferrous sulfate monohydrate into ferrous sulfate heptahydrate. The process runs substantially free of waste water.

Concentration of produced hydrochloric acid is directly dependent on the concentration of the used pickling solution BL. In order to control the concentration of hydrochloric acid and the production of ferrous sulfate monohydrate, ferrous chloride in the pickling solution BL is concentrated by pre-heating the pickling solution BL in a heat exchanger 1 to a temperature of about 95° C. and feeding the heated pickling solution BL to a distillation column 2 for fractioning the pickling solution BL. Water vapor can be withdrawn from the head 3 of the distillation column 2 and cooled down in a cooler 4, whereby the condensate, i.e. water, can be cycled back, at least partly, into the process. Concentrated pickling solution BL is withdrawn from the bottom 5 of the distillation column 2 and fed in a next process step to a precipitating reactor 6. Part of the pickling solution BL is evaporated in an evaporator 7 and returned to the bottom 5 of the distillation column 2.

The pickling solution BL, containing, by weight, about 20–40% ferrous chloride and about 0.3–2% HCl, is mixed in the precipitating reactor 6 with excess sulfuric acid, thereby obtaining ferrous sulfate monohydrate and hydrochloric acid according to the reaction:

$$FeCl_2+H_2SO_4=FeSO_4+2HCl$$

The temperature in the precipitating reactor 6 is about 85° C. and is controlled through intervention of a heat exchanger 8. The mean retention time of the pickling solution BL in the precipitating reactor 6 is about 4 hours.

Water is separated during concentration of the pickling solution BL upstream of the precipitating reactor 6, so that sulfuric acid of low concentration can be admixed in the precipitating reactor 6. In general, the acid content should amount to at least 60% by weight. Currently preferred is an acid content of greater than 78% by weight.

The hot gas phase containing inert gas, water and hydrochloric acid and developing in the precipitating reactor 6 is fed to an absorption tower 9 (HCl absorber) for separating water and hydrochloric acid in counterflow with diluted cold hydrochloric acid. Hydrochloric acid is withdrawn from the bottom 10 of the HCl absorber 9 and cooled down by a cooler 11. A first partial stream of hydrochloric acid is diluted and cycled back via a nozzle (not shown) to the head 12 of the HCl absorber. A second partial stream is withdrawn as finished product and fed to a storage tank for hydrochloric acid.

Obtained in the precipitating reactor 6 is a suspension which is circulated in a side stream NS and heated by the heat exchanger 8. The suspension contains ferrous sulfate monohydrate as undissolved component, whereas the mother liquor contains a minor amount of ferrous sulfate as well as sulfuric acid, hydrochloric acid and water. The suspension is pumped via a band filter 13 for dehumidifying the ferrous sulfate monohydrate. The mother liquor is cycled back to the precipitating reactor 6. Optionally, the ferrous sulfate monohydrate may be washed before carried through the band filter 13.

The dehumidified ferrous sulfate monohydrate is then fed to crystallization reactor 14 in which ferrous sulfate monohydrate is converted into ferrous sulfate heptahydrate in the presence of surplus water according to the reaction:

$$FeSO_4+7H_2O=FeSO_4 \cdot 7H_2O$$

The retention time as well as the temperature in the crystallization reactor 14 can be predefined. In Practice, the retention time is normally between four and eighteen hours at a temperature from 160° C.–200° C.

The suspension in the crystallization reactor 14 is withdrawn and ferrous sulfate heptahydrate present as crystallized product is isolated from water in a band filter 15. As a result a high-quality, durable and free flowing ferrous sulfate heptahydrate is obtained.

The mother liquor filtered out in the band filter 15 is cycled back to the crystallization reactor 14. Optionally, the crystallized produce may subsequently washed to control the acid content.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method of producing ferrous sulfate heptahydrate from ferrous sulfate monohydrate, comprising the steps of:
    reacting a pickling solution containing ferrous chloride ($FeCl_2$), hydrochloric acid (HCl) and water ($H_2O$) in a precipitating reactor with excess of sulfuric acid ($H_2SO_4$) to form ferrous sulfate monohydrate ($FeSO_4$) and hydrochloric acid;
    separating the ferrous sulfate monohydrate and hydrochloric acid;
    dehumidifying the ferrous sulfate monohydrate;
    feeding the ferrous sulfate monohydrate to a crystallization reactor for converting the ferrous sulfate monohydrate in the presence of water into ferrous sulfate heptahydrate as crystallized product at a retention time between four and eighteen hours at a temperature from 160° C. to 200° C.; and
    isolating water from the ferrous sulfate heptahydrate.

2. The method of claim 1, wherein the ratio of pickling solution to sulfuric acid is between 1:3 and 1:5.

3. The method of claim 1, wherein the temperature in the precipitating reactor is about 85° C.

4. The method of claim 1, wherein an acid content in the precipitating reactor is at least 60% by weight.

5. The method of claim 1, wherein an acid content in the precipitating reactor is greater than 78% by weight.

6. The method of claim 1, wherein a mean retention time of the pickling solution in the precipitating reactor is about 4 hours.

7. The method of claim 1, wherein ferrous chloride ($FeCl_2$) is contained in the pickling solution at a fraction of greater or equal to 25% by weight.

8. The method of claim 1, wherein the isolating step includes filtering for separating water.

9. The method of claim 1, wherein the isolating step is realized in a centrifuge for separating water.

10. The method of claim 1, further comprising the step of washing the crystallized product following the isolating step.

11. The method of claim 1, further comprising the step of subjecting the pickling solution to a distillation for increasing the fraction of ferrous chloride ($FeCl_2$).

12. The method of claim 11, wherein the distillation is carried out in a distillation column to concentrate ferrous chloride ($FeCl_2$).

* * * * *